Oct. 5, 1965　　　　N. M. HARFORD　　　　3,209,462
APPARATUS FOR AND METHOD OF SIGHTING AND ADJUSTING FLOODLAMPS
Filed June 24, 1963　　　　　　　　　　　　2 Sheets-Sheet 1

INVENTOR.
NORMAN M. HARFORD
BY
ATTORNEY.

Oct. 5, 1965
N. M. HARFORD
3,209,462
APPARATUS FOR AND METHOD OF SIGHTING AND ADJUSTING FLOODLAMPS
Filed June 24, 1963
2 Sheets-Sheet 2
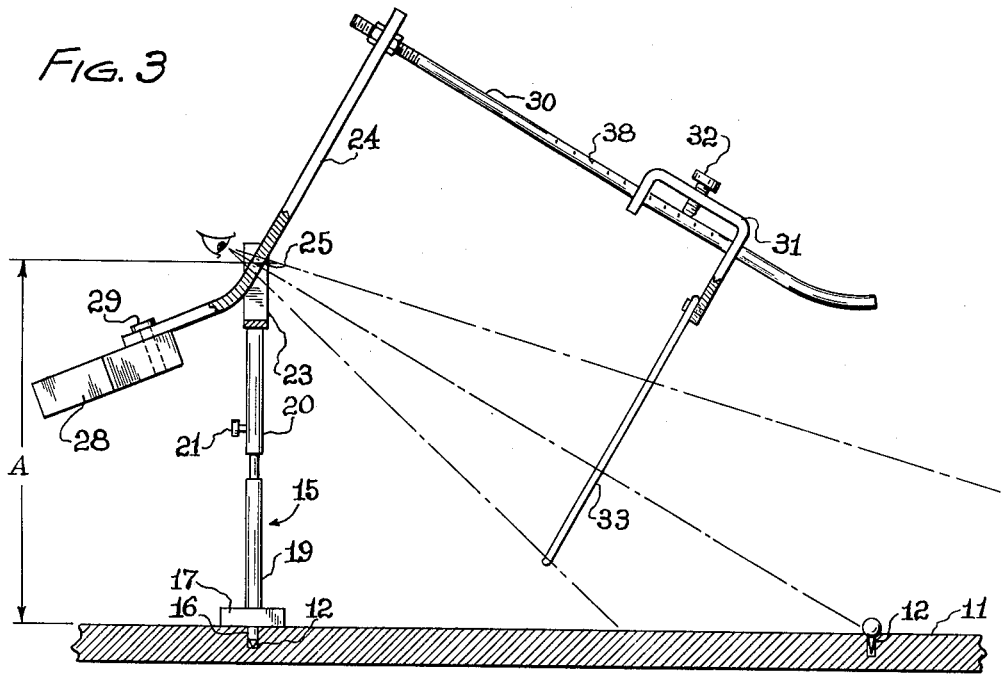
FIG. 3
FIG. 4
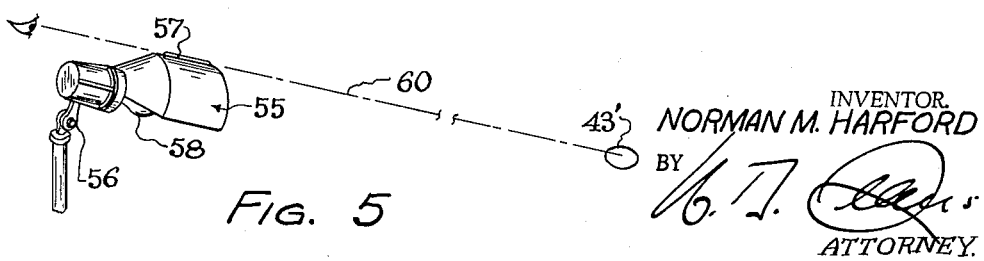
FIG. 5
INVENTOR.
NORMAN M. HARFORD
BY
ATTORNEY.

United States Patent Office 3,209,462
Patented Oct. 5, 1965

3,209,462
APPARATUS FOR AND METHOD OF SIGHTING AND ADJUSTING FLOODLAMPS
Norman M. Harford, 501 S. Poinsettia, Compton, Calif.
Filed June 24, 1963, Ser. No. 289,858
12 Claims. (Cl. 33—180)

This invention relates to the installation and adjusting of floodlamps and more particularly to an improved method and laboratory technique for locating and aiming individual floodlamps from information supplied from a design room and suitable for use by a workman located at the top of a lamp-supporting pole without need for assistance from other workmen or need for a beam of light.

Outdoor floodlamps are used in a great variety of operating environments to illuminate playing fields, parking lots and a wide variety of other areas utilizing banks of floodlights on supporting standards. Heretofore, much time and expense has been required to aim and clamp the individual lamps in a desired position to make the most effective and efficient use of the lamps to illuminate an area to a desired minimum intensity. The most effective results have been obtained heretofore using crews of workmen at nighttime with the lamps energized with part of the crew located at the top of the floodlight standards and others on the ground. A communication problem is presented, particularly in larger installations, as well as a hazard to the equipment and to the workmen owing to the need for adjusting the equipment while energized. Additionally and despite the use of light intensity measuring equipment and the assistance of numerous workmen, still the results obtained using prior techniques for adjusting the floodlights are not as uniform and accurate as desired.

It is an object of the present invention to obviate the foregoing and other shortcomings, disadvantages and great costs incident to the use of prior proposed methods of adjusting and installing floodlights. This is accomplished according to the principles of this invention by the use of simple, inexpensive equipment in the design room. This equipment constructed on a greatly reduced scale utilizes a pegboard having its perforations arranged in a convenient grid scale and on which the area to be lighted can be easily represented by lines or plotted by placing markers along the perimeter of the area to be lighted. A readily movable sighting device constructed to scale and representing the light-supporting standard for the floodlamps is positionable at any point selected for location of the floodlight standards on the actual field being lighted. Using the sighting device, the workman sights through a peep hole representing the position of each individual lamp and along the beam axis of that floodlamp. This not only locates the intersection of the beam axis with the area being lighted but the perimeter and the shape of the area lighted by a beam so adjusted and positioned. The workman then proceeds in a similar manner to locate the focal center and lighting areas of other lamps until the entire area has been floodlighted to a desired intensity, the points of intersection of the individual beam axes with the pegboard being marked in each instance as by inserting a marker in the pegboard. The location data for the individual pegs for the completed lighting pattern is easily transferred to paper and employed by the workman at the site to adjust the individual floodlamps.

Among features of the sighting equipment is provision for readily adjusting the components to represent lamp-supporting standards of different heights and floodlamps of widely differing beam angles.

The information sent to the field installers includes easily identified and distinguished target markers easily installable on the field and representing the target on which individual floodlamp beams are to be focused, it merely being necessary for the workman atop the lamp standard to aim the individual beams onto selected ones of the targets under daylight conditions and without need for energizing the floodlamps themselves.

Accordingly, it is an object of the present invention to provide an improved simplified apparatus and technique providing essential information by which a single workman is enabled to adjust a series of floodlamps in the daytime to provide desired illumination on an area being illuminated.

Another object of the invention is the provision of an improved method of determining the location and adjustment of a group of floodlamps from information supplied from the design room and from which floodlamps can be installed and adjusted under daylight conditions.

Another object of the invention is the provision of a simplified technique for determining the location of a multiplicity of floodlamps using simple sighting equipment constructed on a reduced scale and adapted for use indoors.

Another object of the invention is the provision of simple, easily manipulated equipment for determining the location of floodlamps.

Another object of the invention is the provision of a floodlight design facility utilizing a pegboard constructed to convenient scale and utilizing an adjustable sighting device having peep-sight means readily useable by the designer and by which he can determine the axis of a floodlight beam and the shape of the area illuminated thereby when directed toward a particular portion of the field being illuminated.

These and other more specific objects will appear upon reading the following specification and claims and upon considering in connection therewith the attached drawing to which they relate.

Referring now to the drawing in which a preferred embodiment of the invention is illustrated:

FIGURE 3 is an elevational view on an enlarged scale of the sighting equipment per se;

FIGURE 4 is a perspective view of a floodlight installation and indicating diagrammatically how the information provided by the indoor sighting equipment is employed at the installation site to adjust individual floodlamps; and FIGURE 5 is a perspective view of an individual floodlamp and the manner in which its axis is aligned with the proper marker target on the field.

Figure 1:
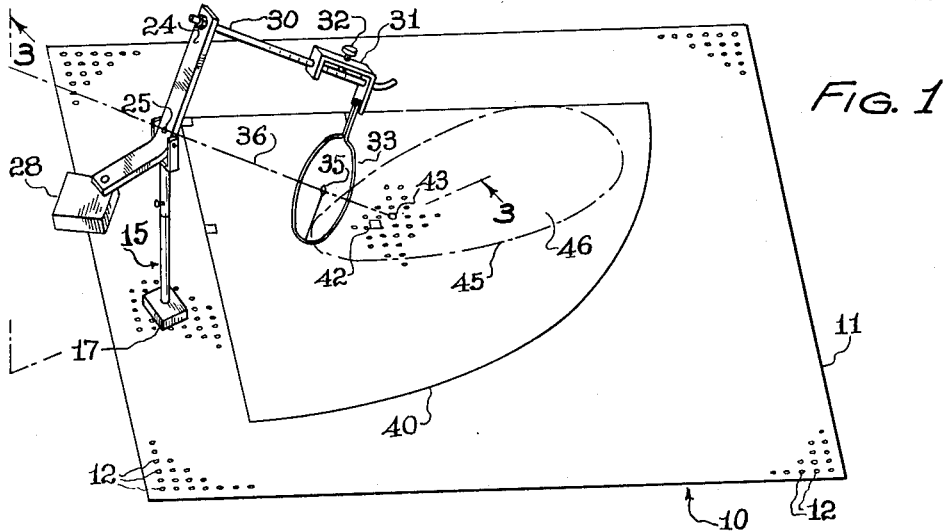
FIGURE 1 is a perspective view of indoor equipment embodying the principles of the present invention.
Figure 2:
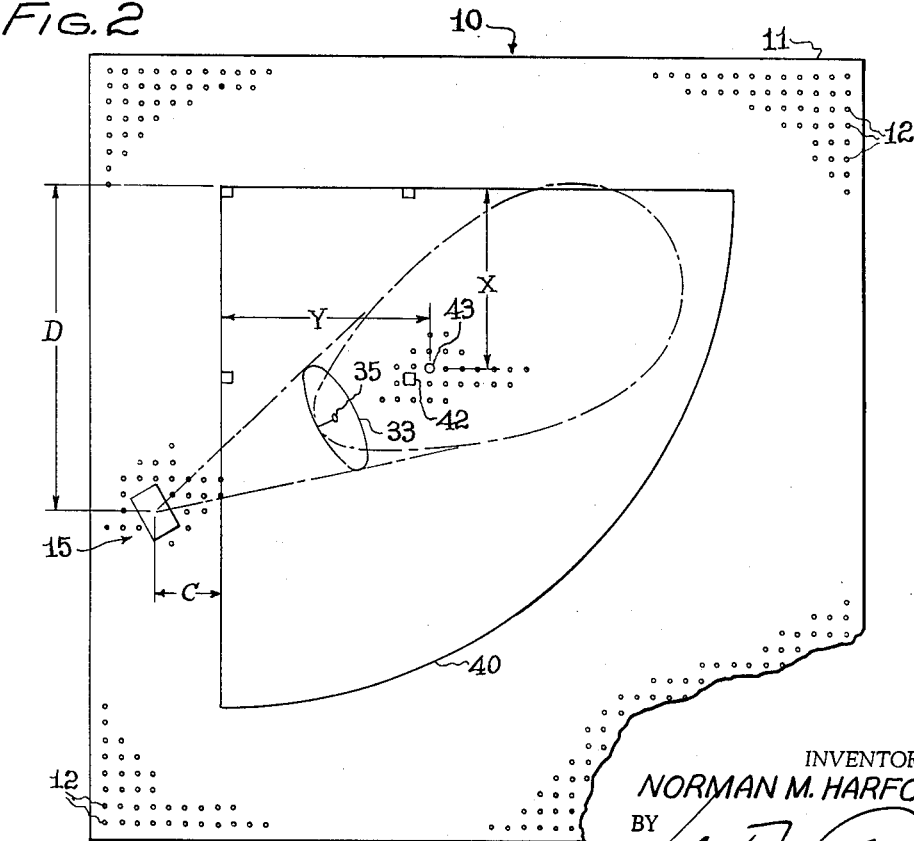
FIGURE 2 is a schematic plan view of the equipment shown in FIGURE 1 showing how it is used to provide information useful to the floodlight installer.

Referring more particularly to FIGURES 1 to 3, there is shown a preferred embodiment of the indoor equipment designated generally 10 used in practicing the present invention.

This equipment comprises a pegboard 11 having perforations 12 located at the intersections of grid lines arranged at right angles to one another to any convenient scale. For example, the distance between adjacent perforations along the grid lines may represent one foot or one yard. Although not so shown, it will be understood that the edges of the pegboard are desirably provided with scales from which distances can be easily read, every fifth line desirably marked in a distinctive color to facilitate quick reading. Additionally, the rim of the perforations in every fifth line may be colored red, white, black or other appropriate easily-viewed color.

Referring now more particularly to FIGURES 1 and 2, it is pointed out that the equipment includes an upright standard 15 having a tip 16 at its lower end sized to seat firmly in one of the perforations 12. The lower end of the standard is also preferably provided with a flat base 17 cooperating with tip 16 in supporting the standard steadily in an upright position when inserted into one of the perforations. Standard 15 is preferably made in upper and lower telescoping halves 19, 20 vertically adjustable relative to one another and clampable in any desired position, as by thumb screw 21.

Fixed to the upper end of standard section 20 is a yoke 23 pivotally supporting a rigid bracket 24 provided with a peep hole 25 traversing the pivot axis of member 24. Adjustably and pivotally supported on the lower end of arm 24 is a counterweight 28 secured to member 24 by a friction fit pin 29 by reason of which counterweight 28 can be adjusted to different positions as necessary to counterbalance the movable portion of the sighting device.

Secured to the upper end of bracket 24 is an extension arm 30 lying normal to the length of the bracket. A U-shaped clamp 31 is slidable along arm 30 and is secured in any adjusted position by a thumbscrew 32. Member 31 supports the forward part of the sighting device comprising a wire ring 33 having a member arranged radially thereof provided with a peep hole 35 at the center of the ring. This enables the observer to aim the sighting device toward pegboard 11 along an axis 36 representing the axis of a floodlight beam. Ring 33 represents the outer envelope of the conical light beam emanating from the floodlamp if positioned at peep hole 25. Floodlamps having a light beam of any desired flare angle can be simulated using the same ring 33 simply by adjusting the supporting bracket 31 to the proper position along supporting arm 30. A scale 38 located on arm 30 facilitates adjustment of the ring to represent floodlamp beams of different conical angles.

The use of the described sighting device and pegboard 11 will be readily understood from the foregoing detailed description of its components. Let it be assumed that a field having a baseball diamond represented generally by the sector-shaped outline 40 is to be floodlighted. This perimeter line is laid out on pegboard 11, the four bases of the diamond being represented by the small squares 42 in the upper right-hand corner of the sector-shaped perimeter 40 and the perimeter of the pegboard representing the outer rim edges of the playing field.

The designer then places sighting device 15 in one of the perforations 12 located at the point where it is contemplated placing a floodlight standard. The beam envelope simulating ring 33 having been properly adjusted along arm 30, the observer then sights through peep hole 25 and adjusts the angle of bracket 24 until his line of sight 36 intersects the pegboard in a proper position to illuminate third base 42. He then places a peg 43 in the perforation 12 closest to the intersection of this line of sight with the pegboard. He next proceeds to draw a line or to place pegs in the board to represent the rim 45 of the generally elliptically shaped area 46 illuminated by that particular floodlamp. At the same time he takes notes on a sheet of paper of the distances of peg 43 from either rim of the pegboard or from the sector edges of the baseball diamond and represented in FIGURE 2 by X and Y respectively. These coordinate distances are quickly read from the pegboard and entered on his data sheet as representing the coordinates for locating the marking point represented by peg 43. Later, as will be explained, these coordinate distances are used on the actual playing field to locate target discs on which a designated floodlamp is to be aimed.

The designer then proceeds in the same manner to aim the sighting device on a different target point on the pegboard. In the case of a baseball field, he will aim a separate one of the floodlamps on each of the principal playing positions throughout the field. It will be understood that the positioning of the lights varies widely and may be carried out in accordance with any of these well known lighting practices. Irrespective of the distribution pattern, the operator notes the overlapping characteristics of the areas 46 illuminated by the adjacent light beams from which he can readily observe the intensity of the lighting at all points and the need for directing additional floodlights on poorly lighted area as necessary to give the desired minimum lighting intensity throughout the field. In this connection it will of course be recognized that after the lamps for a designated supporting standard have been located the workman moves sighting standard 15 to a different location and proceeds in the same manner until all lamps for all floodlamp standards have been positioned and the appropriate coordinate data for each entered on the data sheet.

The completed data sheet prepared as described in the design shop is then forwarded to the site of the actual field to be illuminated along with appropriately colored target discs, there being one for each of the pegs 43 representing an individual floodlamp. Desirably, these discs are provided with pins at their centers by which they can be pressed into and temporarily anchored to the ground.

The playing field having been laid out, a workman then proceeds to insert the target discs at the proper point, such as is indicated at 43′ in FIGURES 4 and 5. For example, target disc 43′ is located near third base 42′ at distances X and Y from the corresponding base lines of the baseball field. These distances are easily and accurately laid out by unskilled workmen whereupon the appropriately marked and colored disc 43′ is pressed into the ground at the designated point. Each of the remaining target discs are similarly located on the playing field.

This operation having been completed, a single workman can proceed to the top of pole 50 supporting a cluster of floodlights at its upper end. Standard 50 is shown located on the actual playing field in the position corresponding to the location sighting device standard 15 in FIGURES 1 and 2, and determined by the coordinate distances C and D from the corresponding perimeter of the baseball playing field represented at 40′ in FIGURE 4.

The floodlamps herein shown by way of illustration correspond in design with those illustrated and disclosed in greater detail in the copending application of Samuel M. Neely and Norman M. Harford, Serial No. 265,741, filed March 18, 1963, for Outdoor Floodlighting Assembly.

Assuming that floodlamp 55 is the one to be aimed at target disc 43′, it will be understood that the workman loosens adjusting clamp 56 connecting the housing of this lamp to the supporting arm and sights along sighting bead 57 formed in the reflector hood 55 and lying parallel to the axis of floodlamp 58. He then adjusts the lamp bracket until the line of sight 60 passing along the crest of bead 57 falls on target disc 43′. He then tightens the bracket clamp securely with assurance that the lamp is properly adjusted to illuminate second base 42′ and the generally elliptically shaped area 46′ enclosed by perimeter line 45′.

Each of the other floodlamps is adjusted in turn in a similar manner until all lamps on all supporting standards have been properly adjusted. The entire installing and sighting operation is accomplished in normal daylight working hours and may be performed entirely by one workman, and desirably prior to completing the electrical connections to a power source. However, this detail is relatively unimportant inasmuch as the adjusting operation is normally performed while the circuits to the floodlamps are open thereby eliminating all risk of shock to the workman or injury to the equipment.

It will also be appreciated that it is unnecessary to employ light intensity measuring equipment on the field at any time since the illuminating intensity can be determined in advance by the designer from the known performance characteristics of the equipment employed.

While the particular apparatus for and method of sighting and adjusting floodlamps herein shown and disclosed in detail is fully capable of attaining the objects and providing the advantages hereinbefore stated, it is to

I claim:

1. That method of installing and adjusting floodlights to illuminate an area with lighting of a desired intensity which comprises laying out the field to be lighted on a model plaque on a greatly reduced scale, positioning a sighting device along the perimeter of the model plaque, sighting through a peephole of said sighting device onto said plaque to determine the proper positions of floodlights to light the plaque area to a desired minimum intensity and determining the focal center of each floodlight on each of a predetermined number of supporting standards positioned at the perimeter of said model plaque, and utilizing the information so obtained to adjust the position of each floodlight at the site under daylight conditions without energizing the floodlights.

2. That method of installing and adjusting standard-supported floodlights for a playing field or the like under daylight condition without need for energizing the floodlights which comprises laying out the field to be lighted to scale in a model, plotting the model using sighting devices thereby to determine the focal points for individual floodlamps adjusted to provide a desired minimum lighting intensity for the area to be lighted, providing appropriately identified markers for each floodlight to be placed at designated points on the field to be lighted, placing said markers on the field to be lighted, and adjusting each floodlight on its standard so that its light axis intersects a designated marker.

3. That method of installing and adjusting standard-supported floodlights for a playing field or the like under daylight conditions without need for energizing the floodlights which comprises laying out the field to be lighted to scale in a model, plotting the model using sighting device means constructed to scale and adapted to be positioned along the perimeter of the model to determine the area of the field illuminated by a particular floodlamp when its axis is directed to intersect the field at a selected point, marking the point so selected, similarly determining the positions of other floodlights so arranged as to provide a desired minimum lighting intensity for the whole field, recording the location of the marking point for each floodlight, transferring the marking points onto the actual field to be illuminated, and adjusting the individual floodlamps for that field to center on predetermined ones of said marking points by visually aiming the axis of the floodlamp onto said marking points.

4. That method defined in claim 3 characterized in the steps of applying grid lines to the surface of said model to a scale easily read by observation whereby the distance of a marking point from two adjacent edges of the field are easily read to facilitate recording location of the individual marking points.

5. That method of installing and adjusting standard-supported floodlights for a playing field or the like under daylight conditions without need for energizing the floodlights which comprises laying out the field to be lighted to scale in a model, applying grid lines to the surface of the model to facilitate quickly visually determining the coordinates of any point on the model from a pair of adjacent perimeter edges, perforating the points of intersection of the grid lines, sighting along the axis of a proposed floodlamp site at the edge of the model area and within a conical envelope representing the field of effective illumination from that lamp while directed onto a selected area of the model field and determining the intersection of the lamp axis with the field as well as the location and bounds of the area which would be lighted by a floodlamp so positioned, recording the information so obtained before proceeding to obtain the same information respecting all floodlamps and their individual positions required to illuminate the model field with a desired minimum intensity, and using the data so obtained to locate sighting targets on the actual field being illuminated, and visually aiming the axis of individual floodlamps on predetermined targets and clamping the floodlamps in adjusted position under daylight conditions and without need for energizing the floodlamps.

6. The method defined in claim 5 characterized in the steps of using colored markers in the perforations of said model field to identify the marking points for different floodlamps, and being further characterized in the use of target discs of assorted colors for the floodlamps mounted on a given supporting standard, said targets being of a size readily seen by a workman at the top of a standard whereby the workman can adjust the floodlamps without assistance from other workmen and merely by aiming each floodlamp onto a target disc of designated color.

7. A device for facilitating the installation and adjustment of floodlamps to illuminate a field in a desired manner from data provided from the laboratory, said device comprising a pegboard having its perforations arranged in a grid prepared to an easily read scale, a sighting device having a standard representing the height of standard-supported floodlights, peep-sight means adjustably supported on the top of said standard and including a ring concentric with the sighting axis thereof and representing the envelope of the light beam produced by a given floodlamp, said sighting device being positionable along the perimeter of a field marked off on said pegboard to the scale of the actual field to be illuminated and enabling an observer to sight through said peep-sight and locate the point of intersection of the light beam on the model field as well as the location and shape of the area illuminated by a light beam emanating from a lamp if positioned at the peep-sight means.

8. A device of the type defined in claim 7 characterized in that said peep-sight means is provided with adjustable counter-balance means effective to hold the same in different adjusted positions.

9. A device of the type defined in claim 7 characterized in that the base end of said standard has a friction fit with the openings in said pegboard whereby to support said standard in an upright position in any selected perforated position on said pegboard.

10. A device as defined in claim 9 characterized in that the lower end of said standard has a flat base spaced upwardly from the lower tip end thereof whereby said tip end can be inserted in a perforation to the extent permitted by said base.

11. A device as defined in claim 10 characterized in that said standard is readily adjustable in height thereby to represent a floodlamp-supporting standard of different selected heights.

12. A device as defined in claim 7 characterized in the provision of means for supporting said ring at different axial distances from said peephole thereby to represent floodlamps of different beam dispersal angles.

References Cited by the Examiner

UNITED STATES PATENTS

| | | | |
|---|---|---|---|
| 1,771,903 | 7/30 | Soth | 33—64 |
| 2,884,697 | 5/59 | Sylvester | 33—1 |

ISAAC LISANN, *Primary Examiner.*

LAWRENCE CHARLES, *Examiner.*